(No Model.)

I. N. HIBBERD & R. HERLITZ.
PREPARING WHEAT FOR CLEANING.

No. 568,681. Patented Sept. 29, 1896.

Witnesses.
F. Monteverde
Frances M. Burt

Inventors
I. N. Hibberd
Robert Herlitz
by Spear & Seely Attys

UNITED STATES PATENT OFFICE.

ISAAC N. HIBBERD AND ROBERT HERLITZ, OF PORT COSTA, CALIFORNIA.

PREPARING WHEAT FOR CLEANING.

SPECIFICATION forming part of Letters Patent No. 568,681, dated September 29, 1896.

Application filed November 26, 1895. Serial No. 570,155. (No model.)

*To all whom it may concern:*

Be it known that we, ISAAC N. HIBBERD and ROBERT HERLITZ, citizens of the United States, residing at Port Costa, in the county of Contra Costa and State of California, have invented certain new and useful Improvements in Preparing Wheat for Cleaning; and we do hereby declare that the following is a full, clear, and exact description thereof.

Our invention relates to the cleaning of grain in bulk, and more particularly to a machine for mingling with the grain the ground plaster usually thrown into it by hand previous to its treatment in the smut-mill.

The object of our invention is to obtain a more perfect and complete distribution of the plaster amid and throughout the grain than can be secured by hand-feeding, the result being that more effective cleansing is afterward done in the smut-mill both in quantity and quality.

The apparatus by which we accomplish the above-named results is shown in the accompanying drawings, in which—

Figures 1, 4:
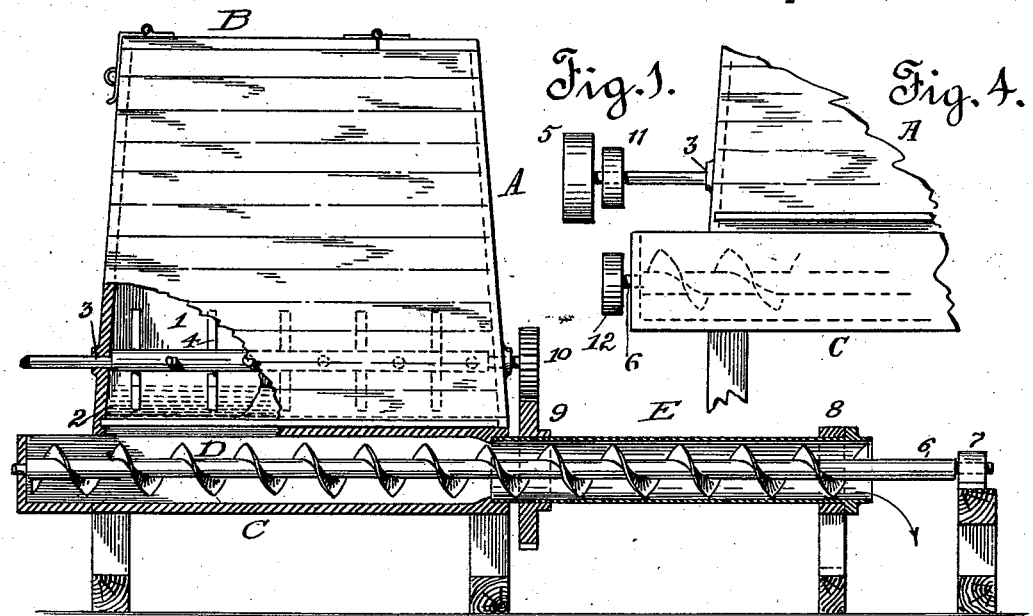
Figure 2:
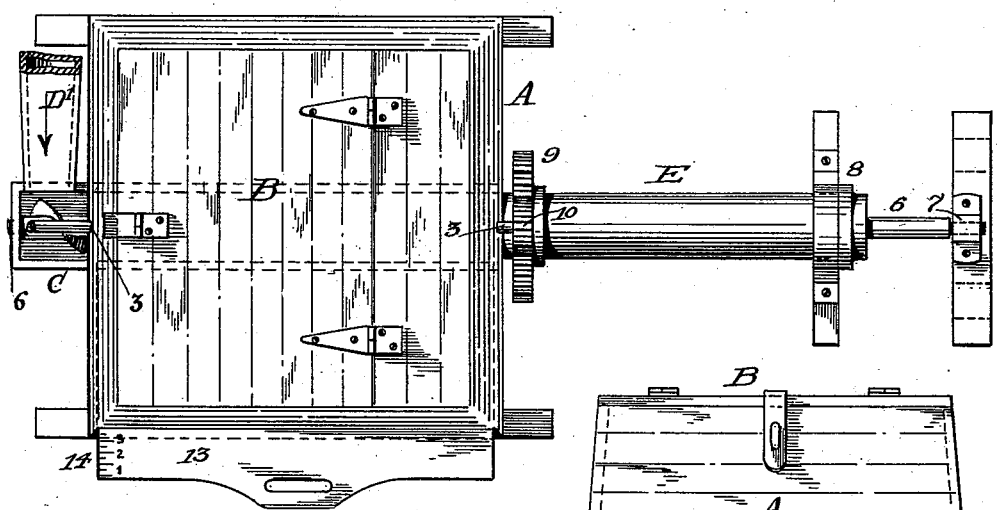
Figure 3:
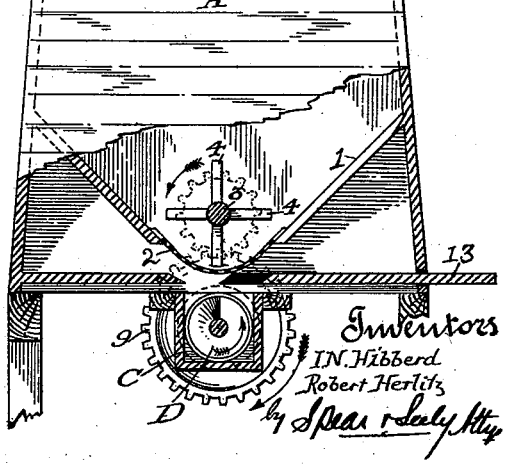

Figure 1 is front elevation, partly in section. Fig. 2 is a plan view. Fig. 3 is an end elevation, partly broken away. Fig. 4 is a broken elevation showing the means for driving the conveyer.

The apparatus shown in the drawings is located in any convenient place intermediate between the grain supply and the smut-mill.

A represents a box or hopper having a cover B, in which the plaster is placed. Within the hopper are deflecting-boards 1, between the lower ends of which is placed an open-work curved screen 2, which thus forms the throat of the hopper. Above this screen and extending endwise through the hopper is a shaft 3, upon which is secured a stirrer composed of projecting arms 4. A driving-pulley 5 is secured upon one end of the shaft outside the hopper. The shaft and stirrers are revolved rapidly just above the curved screen in and through the mass, which is thus thoroughly loosened up and enabled to pass freely through the screen. Below the hopper, and forming, practically, a continuation of it, is a casing C, having one closed and one open end. The closed end has a bearing for the shaft 6 of the conveyer D, which projects through the open end and rests in an external bearing or bearings 7. The length of the conveyer depends upon the arrangement of the apparatus relatively to the smut-mill, the intention being to have it long enough to provide a steady and effective feed. The wheat runs directly from the elevator and is delivered by a chute D' to the conveyer just under the plaster-feeder.

To keep the grain and plaster thoroughly intermingled while being fed by the conveyer, we have provided the rotary conveyer-casing E. The plaster, being of greater specific gravity than the wheat, has a tendency to settle through the latter and collect at the bottom of a stationary casing. The casing E is a cylindrical tube having a bearing at one end in the fixed casing C and at the other in a support 8. On this tube is a gear 9, which meshes with a pinion 10 on one end of the shaft 3. The shaft 3 is also geared to the conveyer-shaft 6, preferably by pulleys 11 12 and a belt. The rotation of the main shaft will therefore rotate the conveyer in one direction and its tubular casing in the opposite direction, as shown by the arrows, the result being that the plaster which works through the wheat is continually lifted and tumbled into and amidst the wheat without being given a chance to settle. The end of the rotary casing is open, as shown, and through it the mixed wheat and plaster escape into a chute or hopper or any other means for supplying the smut-mill.

The feeding of the plaster to the conveyer is regulated by a sliding gate 13, working in guides at the bottom of the hopper and preferably having a scale 14 to indicate in inches or otherwise the size of the discharge-opening.

By means of this apparatus the wheat is supplied to the smut-mill in better condition for cleaning than is possible where the plaster is thrown into it at random by hand, as is the present custom. This results in quicker cleaning of the wheat in the smut-mill, and consequently in the handling of a much greater quantity of wheat in a given time.

What we claim is—

1. In combination, the plaster-hopper, the conveyer-trough extending below the same to receive the plaster therefrom and having an inlet at one end for the wheat, a rotary casing forming a continuation of the trough and through which the conveyer extends and means for rotating the casing.

2. An apparatus for mixing plaster with wheat, and for feeding and conveying them when mixed, consisting of a hopper having an interior stirrer, a fixed casing below the hopper, a screw conveyer therein, a rotary casing communicating with the fixed casing and inclosing a portion of the conveyer, and means for independently rotating the conveyer and the rotary casing substantially as described.

3. In an apparatus for the described purposes, and in combination, a hopper, a stirrer-shaft and stirrers therein a conveyer beneath the hopper, contained in a casing partly fixed and partly rotary, gearing from said stirrer-shaft to the conveyer-shaft, and gearing from said stirrer-shaft to the rotary casing whereby said conveyer and its rotary casing are driven in opposite directions, substantially as described.

In testimony whereof we have affixed our signatures, in presence of two witnesses, this 25th day of October, 1895.

ISAAC N. HIBBERD.
ROBERT HERLITZ.

Witnesses:
W. P. FARRELL,
J. HOPKINS.